United States Patent [19]

Elliott et al.

[11] Patent Number: 4,956,330

[45] Date of Patent: Sep. 11, 1990

[54] CATALYST COMPOSITION FOR THE OXIDATION OF CARBON MONOXIDE

[75] Inventors: David J. Elliott, Bartlesville; John H. Kolts, Ochelata, both of Okla.

[73] Assignee: Phillips Petroleum Company, Bartlesville, Okla.

[21] Appl. No.: 368,493

[22] Filed: Jun. 19, 1989

[51] Int. Cl.$^5$ .................. B01J 21/06; B01J 23/78; B01J 23/89

[52] U.S. Cl. .................................... 502/326

[58] Field of Search ................. 502/326, 330

[56] References Cited

U.S. PATENT DOCUMENTS

| | | | |
|---|---|---|---|
| 3,909,452 | 9/1975 | Acres | 252/455 R |
| 4,117,081 | 9/1978 | Inabe et al. | 423/239 |
| 4,212,854 | 7/1980 | Maki et al. | 423/247 |
| 4,252,687 | 2/1981 | Dale et al. | 252/455 Z |
| 4,294,726 | 10/1981 | Bozon et al. | 252/462 |
| 4,492,770 | 1/1985 | Blanchard et al. | 502/304 |
| 4,497,783 | 2/1985 | Barber | 423/213.5 |
| 4,621,071 | 11/1986 | Blanchard et al. | 502/302 |
| 4,639,432 | 1/1987 | Holt et al. | 502/324 |

*Primary Examiner*—W. J. Shine
*Attorney, Agent, or Firm*—K. K. Brandes

[57] ABSTRACT

A composition of matter comprises (a) a titania-containing support material, (b) platinum metal, (c) iron oxide, and (d) at least one alkali metal compound (preferably potassium compound). The composition of matter is used as catalyst in the reaction of carbon monoxide and free oxygen to carbon dioxide.

23 Claims, No Drawings

CATALYST COMPOSITION FOR THE OXIDATION OF CARBON MONOXIDE

BACKGROUND OF THE INVENTION

This invention relates to the catalytic oxidation of carbon monoxide to carbon dioxide, in particular under conditions suitable for laser applications. In another aspect, this invention relates to effective CO oxidation catalyst compositions. In a further aspect, this invention relates to a process for preparing CO oxidation catalyst compositions.

The use of catalysts for the oxidation of carbon monoxide to carbon dioxide by reaction with oxygen, in particular at low temperature, is of much interest, e.g., in breathing masks designed to remove CO from inhaled air, in smoking articles (e.g., cigarettes) so as to remove CO from tobacco smoke, and in $CO_2$ lasers for combining CO and $O_2$ formed by dissociation of $CO_2$ during discharge. In the latter application, the presence of $O_2$ is most undesirable because it can cause a breakdown of the electrical field in the laser cavity. Even though compositions useful as CO oxidation catalysts in $CO_2$ laser applications are known, there is an ever present need to develop new, effective CO oxidation catalyst compositions and/or improved processes for preparing effective CO oxidation catalyst compositions.

SUMMARY OF THE INVENTION

It is an object of this invention to provide a composition of matter which is effective as a catalyst for the oxidation of carbon monoxide with free oxygen. It is a further object of this invention to provide an effective process for catalytically oxidizing carbon monoxide. Other objects and advantages will be apparent from the detailed description and the claims.

In accordance with this invention, an improved composition of matter (effective as catalyst composition for the reaction of carbon monoxide and free oxygen to carbon dioxide) comprises (a) a titania-containing support material, preferably titania or, alternatively, a titania-coated porous ceramic material (more preferably a titania-coated monolith), (b) platinum metal, (c) iron oxide, and (d) at least one compound of at least one alkali metal (i.e., Li, Na, K, Cs, Rb or mixtures thereof; preferably potassium).

Also in accordance with this invention, a process for reacting CO with $O_2$ to form $CO_2$ is carried out in the presence of the composition of matter described above comprising (preferably consisting essentially of) (a), (b), (c) and (d).

DETAILED DESCRIPTION OF THE INVENTION

Any titania-containing support material can be used as the support material (a). Titania, the preferred support material, is commercially available. The method of preparation of titania is not considered critical. Titania can be prepared by flame hydrolysis of volatile titania compounds; or by precipitation from an aqueous solution of titanium compounds with an alkaline reagent, followed by washing, drying and calcining; and the like. Mixtures of titania with minor amounts (such as about 0.1–8 weight %) alumina and/or magnesia can be used.

Generally the surface area (determined by the BET method employing $N_2$; ASTM D3037) of titania is in the range of from about 10 to about 300 m²/g. Titania can have spherical, trilobal, quadrilobal or irregular shape. When titania spheres are used, their diameter generally is in the range of from about 0.5 to about 5 mm.

It is within the scope of this invention to prepare suitable support materials by coating a porous ceramic material, such as a monolith (commercially available from Corning Glass Works, Corning, N.Y.), a glass frit, sintered alumina and the like, with titania. The choice of the ceramic material is determined by cost, pore structure, surface area, attrition resistance and similar factors. The porous ceramic material (preferably a monolith) can be impregnated with organic compounds of Ti (such as a titanium tetraalkoxide), hydrolyzed, dried and calcined. Or the porous ceramic material (preferably monolith) can be impregnated with a dispersion of titania particles, followed by drying and calcining.

Alternatively, a porous ceramic material can be impregnated with a colloidal dispersion (colloidal solution) of titania. Preferably, colloidal particles of titania having an average particle diameter of about 1 to about 100 nanometers, more preferably about 5 to about 20 nanometers, are dispersed in any suitable liquid dispersion medium, such as water, alcohols, ketones and the like, preferably water. Generally, the concentration of $TiO_2$ in the colloidal dispersion is in the range of from about 0.1 to about 50, preferably from about 5 to about 25, weight percent $TiO_2$. The weight ratio of colloidal dispersion of $TiO_2$ to porous ceramic material is chosen so as to provide a $TiO_2$ content in the titania-coated porous ceramic material of about 1 to about 40 weight % $TiO_2$, preferably about 5 to about 30 weight % $TiO_2$.

The promoters, Pt, Fe oxide and at least one alkali metal compound, can be incorporated into the composition of matter in any suitable manner. Preferably, the titania-containing support material, more preferably titania, can be impregnated with compounds of Pt, Fe and alkali metal in any suitable manner. First, compounds of Pt, Fe and alkali metal(s) are dissolved in a suitable solvent (preferably water) so as to prepare a combined solution containing two or three compounds of Pt, Fe and alkali metal or, alternatively, separate solutions of each compound at suitable concentrations, generally containing from about 0.005 to about 0.20, preferably about 0.01 to about 0.1, g Pt and/or Fe and/or alkali metal per cc of solution. Non-limiting examples of suitable compounds of Pt are: $PtCl_2$, $PtCl_4$, $H_2PtCl_6$, $PtBr_4$, $Pt(NH_3)_4Cl_2$, $Pt(NH_3)_4(NO_3)_2$ and the like. Non-limiting examples of suitable compounds of Fe are: $FeCl_2$, $FeCl_3$, $Fe_2(SO_4)_3$, $Fe(NO_3)_2$, $Fe(NO_3)_3$, $(NH_4)_4Fe(CN)_6$, Fe acetylacetonate, and the like. Non-limiting examples of suitable compounds of alkali metals include: chlorides of Li, Na, K, Rb and Cs; nitrates of Li, Na, K, Rb and Cs; sulfates or bisulfates of Li, Na, K, Rb and Cs; acetates or other carboxylates of Li, Na, K, Rb and Cs; carbonates or bicarbonates of Li, Na, K, Rb and Cs; hydroxides of Li, Na, K, Rb and Cs, and the like. Presently preferred are $Pt(NH_3)_4(NO_3)_2$, $Fe(NO_3)_3$ and $K_2CO_3$.

The $TiO_2$-containing support material can be impregnated sequentially in any order or simultaneously with the solution(s) containing dissolved or colloidally dispersed compounds of Pt, Fe and alkali metal, respectively. The $TiO_2$-containing support material is generally impregnated by soaking it with the solution(s) of the above-described promoter compounds. Alternatively, the solutions are sprayed onto the support material. The ratio of solution(s) to support material generally is selected such that the final catalyst contains about 0.1 to about 10, preferably about 0.2 to about 5, weight % Pt; about 0.05 to about 20, preferably about 0.1-5, weight % Fe; and about 0.1 to about 5, preferably about 0.2 to about 3, weight percent alkali metal (preferably K). It is, however, within the scope of this invention to have components (b), (c) and (d) present at such levels and such ratios that component (d) acts as a copromoter for components (b) and (c) in the catalytic oxidation of CO with $O_2$ (in particular when this oxidation is carried out at about 10°-50° C.). When a $TiO_2$-coated porous ceramic material (preferably monolith) is used, the above weight percentages of Pt, Fe and alkali metal are based on the weight of the composition of matter excluding the ceramic material (e.g., monolith), as has been pointed out in U.S. patent application Ser. No. 192,264, filed May 6, 1988, the entire disclosure of which is herein incorporated by reference. It is within the scope of this invention to have additional copromoters present, such as Ag, Cu, Ru, Re, Sm, Eu, as per disclosure in Ser. No. 192,264.

After the impregnation of the titania-containing support material with Pt, Fe and alkali metal compounds (either by simultaneous impregnation or by sequential impregnation in any order), the impregnated titania-containing support material is heated, either in an inert or in an oxidizing atmosphere, preferably in a free oxygen containing gas atmosphere (such as air), generally at a temperature ranging from about 30° to about 700° C. Preferably, this heating step is carried out in two sequential sub-steps: a drying step at about 30° to about 200° C. (preferably at 80°-130° C.), generally for about 0.5 to about 10 hours, so as to substantially dry the impregnated material (preferably under such conditions as to reduce the level of adhered and occluded water to less than about 10 weight %); and then a calcining step at about 300° to about 700° C. (preferably about 400° to about 600° C.), generally for about 1 to about 20 hours, under such conditions as to at least partially (preferably substantially) convert the Pt and Fe compounds to oxides of Pt and Fe, on titania. The alkali metal compound can remain unchanged but can also be at least partially converted to oxides and/or hydroxides of alkali metal during this heating step. If sequential impregnation of the titania-containing support material is carried out, it is within the scope of this invention to dry or, alternatively, dry and calcine the material after each impregnation step.

Finally, the impregnated, dried and calcined $TiO_2$-containing material is reduced. The reducing step can be carried out in any suitable manner, preferably at a temperature in the range of from about 20° to about 600° C., more preferably from about 150° to about 300° C. When a titania-coated porous ceramic material is used as support material, the reducing step can be carried out at a lower temperature, preferably in the range of from about 0° to about 300° C., more preferably about 20° to about 200° C. Any reducing gas can be employed in the reducing step, such as a gas comprising $H_2$, CO, gaseous hydrocarbons such as methane, mixtures of the above, and the like. Preferably, a free hydrogen containing gas, more preferably substantially pure $H_2$, is employed. The reducing step can be carried out for any suitable period of time suitable to activate (for catalyzing the reaction of CO and $O_2$ to $CO_2$) the calcined material obtained in the previous step, preferably from about 0.5 to about 20 hours. In the composition of matter which is formed in the reducing step, Pt exists substantially as Pt metal. However, it is believed that insignificant amounts of oxides of Pt may also be present. The iron component in the composition of matter of this invention is present substantially as iron oxide (FeO, $Fe_2O_2$, $Fe_3O_4$); however, it is believed that insignificant amounts of metallic iron may also be present (especially when a relatively high reducing temperature of 400° C. or higher is employed). It is believed that generally the alkali metal is substantially present in the composition of matter of this invention as oxide or hydroxide or carbonate or mixtures thereof (depending on which alkali metal compound was used in the impregnation step).

The process for oxidizing a carbon monoxide containing feed gas can be carried at any suitable temperature and pressure conditions, for any suitable length of time, at any suitable gas hourly space velocity, and any suitable volume ratio of CO and $O_2$. The reaction temperature generally is in the range of from about −50° to about 400° C., preferably from −30° to about 170° C., more preferably from about 10° to about 50° C. The pressure during the oxidation process generally is in the range of from about 1 to about 2,000 psia, more preferably from about 5 to about 20 psia. The volume ratio of CO to $O_2$ in the feed gas can range from about 1:100 to about 100:1, and preferably is in the range of about 1:10 to about 10:1. The volume percentage of CO and the volume percentage of $O_2$ in the feed gas can each be in the range of from about 0.05 to about 50, preferably from about 0.5 to about 3. The gas hourly space velocity (cc feed gas per cc catalyst per hour) can be in the range of from about 1 to about 200,000, preferably from about 100 to about 30,000. It is understood that the calculation of the gas hourly space velocity is based on the volume of the active catalyst i.e., the titania-supported Pt/Fe oxide/alkali metal compound catalyst, excluding the volume occupied by any additional ceramic support material, such as a monolith material.

The feed gas can be formed in any suitable manner, e.g., by mixing CO, $O_2$ and optionally other gases such as $CO_2$, $N_2$, He and the like, such as in a carbon dioxide containing laser cavity. Or the feed gas can be an exhaust gas from a combustion engine, or it can be air that is to be inhaled by humans and contains undesirable levels of toxic carbon monoxide, or smoke from a cigarette or cigar or pipe, and the like. The feed gas can be contacted in any suitable vessel or apparatus, such as in a laser cavity, or in an exhaust pipe of a combustion engine, or in a gas mask used by humans, or in a cigarette or pipe filter, wherein the feed gas passes over the catalyst composition of this invention at the conditions described above. The CO oxidation process of this invention can be carried out in any suitable setting and for any purpose, e.g., for recombining CO and $O_2$ in $CO_2$ lasers, to oxidize CO contained in exhaust gases or air, to make isotopically labeled $CO_2$ and CO and the $8^{18}O$ isotope, and the like.

The following examples are presented in further illustration of the invention and are not to be construed as unduly limiting the scope of the invention.

EXAMPLE I

This example illustrates the experimental setup for testing the activity of noble metal catalysts for catalyzing the oxidation of carbon monoxide (so as to simulate catalytic recombination of CO and $O_2$ in $CO_2$ lasers). A gaseous feed blend comprising 1.2 volume % CO, 0.6 volume % $O_2$, 32 volume % $CO_2$, 32 volume % He and 34 volume % N₂ was passed through a needle valve and a glass reactor in an upflow direction. The glass reactor tube had an inner diameter of about 6 mm and generally contained about 2.1 gram catalyst in a bed of about 5 cm height. The temperature in the catalyst bed was measured by means of a thermocouple inserted into the top layer of the catalyst bed. The CO content in the reactor effluent was determined by means of a Series 400 Anarad IR analyzer. All tests were carried out at ambient conditions (about 23°–30° C.). The, feed rate of the gaseous feed stream was about 400 cc/minute.

EXAMPLE II

This example illustrates the preparation of titania-supported catalyst compositions and their performance in CO oxidation tests.

Catalyst A (Control) contained 3.0 weight % Pt and 0.5 weight % Fe (as oxide) on $TiO_2$. It was prepared by mixing, at room temperature, 5.0 g of flame-hydrolyzed titania (provided by Degussa Corporation, Teterboro, N.J.; having a BET/N₂ surface area of about 50 m²/g) with a mixture of 3.75 cc of an aqueous $Pt(NH_3)_4(NO_3)_2$ solution containing 0.02 g Pt/cc and 2.5 cc of an aqueous $Fe(NO_3)_3 \cdot 9H_2O$ solution containing 0.01 g Fe/cc. After impregnation, Catalyst A was dried overnight at about 100° C. and calcined in air at about 400° C. for 2 hours. The above-described impregnation with the $Pt(NH_3)_4(NO_3)_2$ and $Fe(NO_3)_3$ solutions, drying and calcining was repeated. Then the calcined, twice-impregnated Catalyst A was treated for 2 hours with hydrogen at 200° C.

Catalyst B (Invention) was prepared by impregnating 3.2 g of Catalyst A with 1.5 cc of an aqueous $K_2CO_3$ (containing 1.88 g $K_2CO_3$ per 100 cc solution), drying the K-impregnated material for 16 hours at 100° C., calcining the dried material in air for 2 hours at 400° C., and treating the calcined material for 2 hours with hydrogen gas at 200° C. Catalyst B contained 0.5 weight % K, 3.0 weight % Pt and 0.5 weight % Fe (as oxide) on titania.

Catalyst A and B were then tested according to the CO oxidation test procedure described in Example 1. Test results are summarized in Table I.

TABLE I

| Catalyst | Hours on Stream | % of CO in Feed | cc per Minute per G Catalyst |
|---|---|---|---|
| A | 1 | 94.2 | 2.15 |
| (Control) | 2 | 88.4 | 2.02 |
| | 3 | 83.5 | 1.91 |
| | 4 | 80.2 | 1.83 |
| | 6 | 77.7 | 1.77 |
| | 8 | 74.4 | 1.70 |
| | 10 | 70.2 | 1.60 |
| | 12 | 67.8 | 1.55 |
| | 14 | 66.1 | 1.51 |
| | 16 | 64.5 | 1.47 |
| | 20 | 62.8 | 1.43 |
| | 24 | 62.8 | 1.43 |
| B | 1 | 100.0 | 2.32 |
| (Invention) | 2 | 98.0 | 2.27 |
| | 3 | 95.0 | 2.20 |
| | 4 | 92.0 | 2.13 |
| | 6 | 87.0 | 2.02 |
| | 8 | 84.0 | 1.94 |
| | 10 | 82.1 | 1.90 |
| | 12 | 80.0 | 1.85 |
| | 14 | 78.8 | 1.83 |
| | 16 | 76.8 | 1.78 |
| | 20 | 74.0 | 1.71 |
| | 24 | 72.7 | 1.68 |

Test results in Table I clearly show that the K/Pt/Fe/TiO₂ Catalyst B of this invention was more active for CO oxidation with O₂ (at 23° C.) than Catalyst A (without K).

Reasonable variations, modifications, and adaptations for various usages and conditions can be made within the scope of the disclosure and the appended claims, without departing from the scope of this invention.

That which is claimed is:

1. A composition of matter consisting essentially of (a) a support material consisting essentially of titania, (b) platinum metal, (c) iron oxide, and (d) at least one compound of at least one alkali metal;

wherein said composition of matter is active as a catalyst for the oxidation of carbon monoxide with free oxygen to carbon dioxide at about 10°–50° C.; and said composition of matter contains components (b), (c) and (d) in amounts such that component (c) is a copromoter for component (b) on said support material in said oxidation at about 10°–50° C., and component (d) is a copromoter for the combination of components (b) and (c) on said support material in said oxidation at about 10°–50° C.

2. A composition of matter in accordance with claim 1, wherein said at least one alkali metal is potassium.

3. A composition of matter in accordance with claim 1 containing about 0.1 to about 10 weight % Pt, about 0.05 to about 20 weight % Fe, and about 0.1 to about 5 weight % alkali metal.

4. A composition of matter in accordance with claim 3, wherein said at least one alkali metal is potassium.

5. A composition of matter in accordance with claim 4 containing about 0.2–5 weight % Pt, about 0.1–5 weight % Fe and about 0.2–3 weight % K.

6. A composition of matter in accordance with claim 1, having been prepared by a process comprising the steps of impregnating titania with aqueous solutions of compounds of platinum, iron and at least one alkali metal; heating the thus-obtained impregnated titania material so as to substantially dry said impregnated titania material; calcining the substantially dried, impregnated titania material so as to substantially convert said compounds of platinum and iron to oxides of platinum and iron; and treating the obtained calcined impregnated titania material with a reducing gas, under such conditions as to activate said calcined, impregnated titania material or catalyzing the oxidation of carbon monoxide with free oxygen to carbon dioxide at about 10°–50° C.

7. A composition of matter in accordance with claim 6, wherein said alkali metal is potassium.

8. A composition of matter in accordance with claim 6, wherein said reducing gas comprises free hydrogen.

9. A composition of matter in accordance with claim 6, wherein said alkali metal is potassium, and said treating with a reducing gas comprises treating with free hydrogen at about 20°–600° C.

10. A composition of matter consisting essentially of (a) a support material consisting essentially of titania-coated porous ceramic material, (b) platinum metal, (c) iron oxide, and (d) at least one compound of at least one alkali metal;

wherein said composition of matter is active as a catalyst for the oxidation of carbon monoxide with free oxygen to carbon dioxide at about 10°–50° C.; and said composition of matter contains component (c) is a copromoter for component (b) on said support material in said oxidation at about 10°–50° C., and component (d) is a copromoter for the combination of components (b) and (c) on said support material in said oxidation at about 10°–50° C.

11. A composition of matter in accordance with claim 10, wherein said at least one alkali metal is potassium.

12. A composition of matter in accordance with claim 10, wherein said porous ceramic material is a monolith.

13. A composition of matter in accordance with claim 10, wherein component (a) contains about 1–40 weight % $TiO_2$.

14. A composition of matter in accordance with claim 10 containing about 0.1 to about 10 weight % Pt, about 0.05 to about 20 weight % Fe, and about 0.1 to about 5 weight % alkali metal, based on the weight of the composition of matter excluding the porous ceramic material.

15. A composition in accordance with claim 14, wherein said porous ceramic material is a monolith.

16. A composition of matter in accordance with claim 14, wherein said alkali metal is potassium.

17. A composition of matter in accordance with claim 16, wherein said porous ceramic material is a monolith.

18. A composition of matter in accordance with claim 17 containing about 0.2–5 weight % Pt, about 0.1–5 weight % Fe and about 0.2–3 weight % K, based on the weight of the composition of matter excluding the monolith.

19. A composition of matter in accordance with claim 10, having been prepared by a process comprising the steps of impregnating a titania-coated ceramic material with aqueous solutions of compounds of platinum, iron and at least one alkali metal; heating the thus-obtained impregnated tititia coated ceramic material so as to substantially dry said impregnated titania-coated ceramic material; calcining the substantially dried, impregnated titania-coated ceramic material so as to substantially convert said compounds of platinum and iron to oxides of platinum and iron; and treating the obtained calcined, impregnated titania-coated ceramic material with a reducing gas, under such conditions as to activate said calcined, impregnated titania-coated ceramic material for catalyzing the oxidation of carbon monoxide with free oxygen to carbon dioxide at about 10°–50° C.

20. A composition of matter in accordance with claim 19, wherein said at least one alkali metal is potassium.

21. A composition of matter in accordance with claim 19, wherein said reducing agent comprises free hydrogen.

22. A composition of matter in accordance with claim 19, wherein said alkali metal is potassium, and said treating with a reducing gas comprises treating with free hydrogen at about 20°–600° C.

23. A composition in accordance with claim 19, wherein said ceramic material is a monolith.

* * * * *